United States Patent
Sitzler et al.

(10) Patent No.: US 7,163,251 B2
(45) Date of Patent: Jan. 16, 2007

(54) MOTOR-VEHICLE SEAT-BACK STORAGE COMPARTMENT

(75) Inventors: Wolfgang Sitzler, Wuppertal (DE); Jürgen Salewski, Dusseldorf (DE)

(73) Assignee: BOS GmbH & Co. KG, Ostfildern (DE)

( * ) Notice: Subject to any disclaimer, the term of this patent is extended or adjusted under 35 U.S.C. 154(b) by 37 days.

(21) Appl. No.: 10/992,635

(22) Filed: Nov. 18, 2004

(65) Prior Publication Data

US 2005/0116490 A1    Jun. 2, 2005

(30) Foreign Application Priority Data

Nov. 19, 2003    (DE) ................. 103 54 160

(51) Int. Cl.
*B60N 3/12* (2006.01)
(52) U.S. Cl. ............ 296/37.8; 296/24.43; 296/24.46; 296/66; 297/188.18; 297/188.06
(58) Field of Classification Search ............ 296/24.43, 296/24.46, 37.8, 37.16, 37.15, 66, 69, 24.44, 296/24.45, 37.6; 297/188.15, 188.17, 188.16, 297/188.18, 188.19, 188.04, 188.06, 188.07
See application file for complete search history.

(56) References Cited

U.S. PATENT DOCUMENTS

| 5,286,084 | A | * | 2/1994 | Bart ..................... 297/188.04 |
| 5,516,191 | A | * | 5/1996 | McKee ................. 297/188.15 |
| 5,628,543 | A | * | 5/1997 | Filipovich et al. ......... 296/37.1 |
| 6,398,284 | B1 | | 6/2002 | Butz |
| 6,508,499 | B1 | * | 1/2003 | Guanzon et al. ......... 296/37.16 |
| 6,899,365 | B1 | * | 5/2005 | Lavelle et al. ........... 296/37.16 |
| 6,986,190 | B1 | * | 1/2006 | Jost ........................ 297/188.07 |
| 6,997,508 | B1 | * | 2/2006 | Jaaska, Sr. ............... 297/188.15 |

FOREIGN PATENT DOCUMENTS

DE    10132081    5/2002
EP    0985580    3/2000

* cited by examiner

*Primary Examiner*—Jason Morrow
(74) *Attorney, Agent, or Firm*—Andrew Wilford

(57) ABSTRACT

A storage compartment for a motor vehicle having a partition has an annular vehicle frame set in the partition, a container set in the vehicle frame and having an open side, a cover fittable over the open side, and a mounting system for releasably securing the cover over the open side and permitting complete separation of the cover from the container.

14 Claims, 4 Drawing Sheets

MOTOR-VEHICLE SEAT-BACK STORAGE COMPARTMENT

FIELD OF THE INVENTION

The present invention relates to a storage compartment for a motor vehicle. More particularly this invention concerns such a storage compartment that is built right into a seat back or the like.

BACKGROUND OF THE INVENTION

U.S. Pat. No. 6,398,284 describes a transport container for a motor vehicle having a partition between two compartments. The container has a generally rectangular vehicle frame set in the partition and having generally parallel longitudinal members and generally parallel transverse members interconnecting ends of the longitudinal members and defining therewith an opening. A generally rectangular device frame fittable in the opening of the vehicle frame has generally parallel longitudinal members and generally parallel transverse members interconnecting ends of the respective longitudinal members. Respective pivot formations on the vehicle frame between the vehicle-frame longitudinal members define a pivot axis parallel to and between the vehicle-frame longitudinal members. Respective pivot formations on the device frame between and parallel to the device-frame longitudinal members and fittable to the respective vehicle-frame pivot formations allow pivoting of the device frame into a mounted position set in the vehicle frame with the members of the device frame closely juxtaposed with the respective members of the vehicle frame and the frames in direct contact with each other at abutment locations offset from the axis. A latch offset from the axis releasably secures the device frame in the mounted position in the vehicle frame.

This construction is fairly simple and allows the device frame to be fitted to the vehicle frame by a simple central pivoting movement. At the end of the pivoting movement the upper and lower longitudinal members engage each other to block further movement of the device frame, then the latch holds the frames in this position. Such a system is extremely useful. For instance the device frame can hold a ski bag so that a front panel on the device frame is swung down and skis can be poked into the bag to extend into a rear compartment, with the skis encased by the bag so they do not get anything back there dirty or wet. Alternately the device frame can hold a small refrigerator or cooler with an openable front door.

The problem for the manufacturer of the vehicle or seat is that it is impossible to know whether the end user is going to want something as simple as a cup holder installed in the seat-back storage compartment, or as complex as a DVD player with screen. Thus the compartment might need custom reworking or rebuilding by the car dealer, and complete replacement is not ruled out if the application of the storage compartment changes.

OBJECTS OF THE INVENTION

It is therefore an object of the present invention to improve on this type of motor-vehicle seat-back storage compartment.

Another object is the provision of such an improved motor-vehicle seat-back storage compartment that can be more flexibly used, that is that can be adapted to many different uses and even switched easily from one use to another.

SUMMARY OF THE INVENTION

A storage compartment for a motor vehicle having a partition between two compartments has according to the invention an annular vehicle frame set in the partition, a container set in the vehicle frame and having an open side, a cover fittable over the open side, and a mounting system for releasably securing the cover over the open side and permitting complete separation of the cover from the container.

Thus the storage-compartment cover can be completely removed, either to get it out of the way for use of the storage compartment or so that it can be replaced by another cover serving another purpose. For instance, a ski bag unit that is used in the winter, with skis held in a bag extended out the back of the unit into the rear passenger compartment or trunk, is switched in the summer for a refrigerator or cooler.

The instant invention is distinguished from a standard such storage compartment, like the above-mentioned refrigerator or ski bag, having an openable door. The front panel is completely removable in accordance with the invention without the use of tools. Thus even with a ski bag when there is no arm rest to support the front panel when it is open, the cover is completely removed.

Another substantial advantage of the instant invention is that the panel can be custom made or can have a custom mount for an automobile accessory, e.g. piece of electronic equipment. The mounting bracket of a DVD, CD, or videocassette player, a video display, or the like can be used as the mount, and the cover itself can have a window for the face of the display or the load slot of a DVD, CD, or videocassette player. Alternately the cover can be constructed as a food tray and/or cup holder.

The partition in accordance with the invention is a seat back and the cover is relative to a normal motor-vehicle travel direction a front wall of the container.

The mounting system according to the invention includes a releasable latch actuatable to disconnect the cover. The cover is movable without disconnection from the partition between a closed position and an open position, normally pivoting about a horizontal axis at the lower end of the cover. The latch is actuatable only in the open position. In addition the latch includes a spring biasing it into a position normally securing the cover to the partition and a hook. The user thus opens the storage compartment by means of the latch normally provided as disclosed in the above-cited patent at the upper end of the front panel, then reaches in behind the front panel and actuates the latch to disconnect it and remove the cover. The mounting system can be a force-fit hinge that releases the cover when the cover is pulled radially of the hinge axis away from the hinge with a force exceeding any force the cover would be subjected to in normal use.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
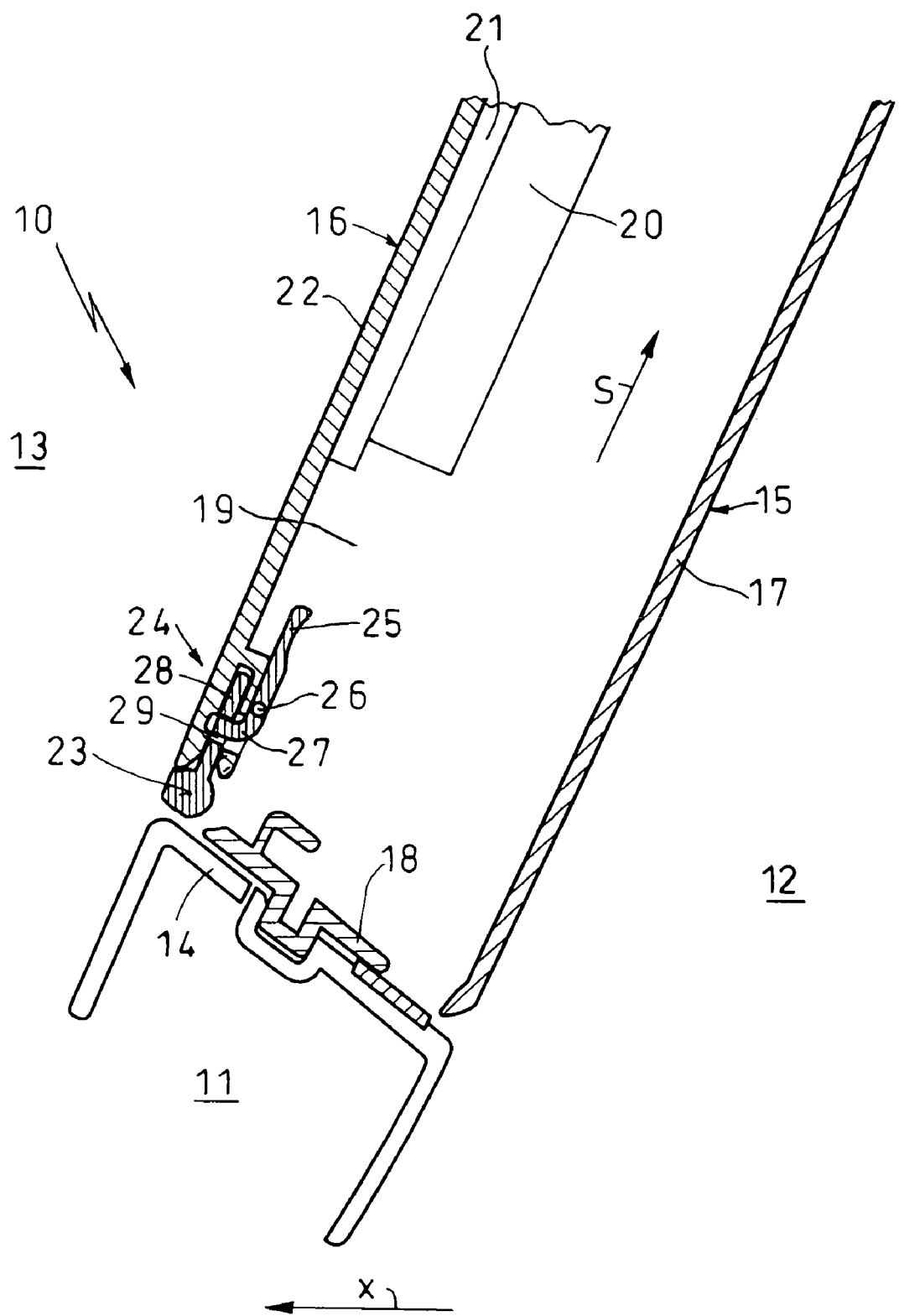
FIGS. 1 and 2 are sections through details of the storage compartment according to the invention in closed and open positions, respectively.
Figure 2:
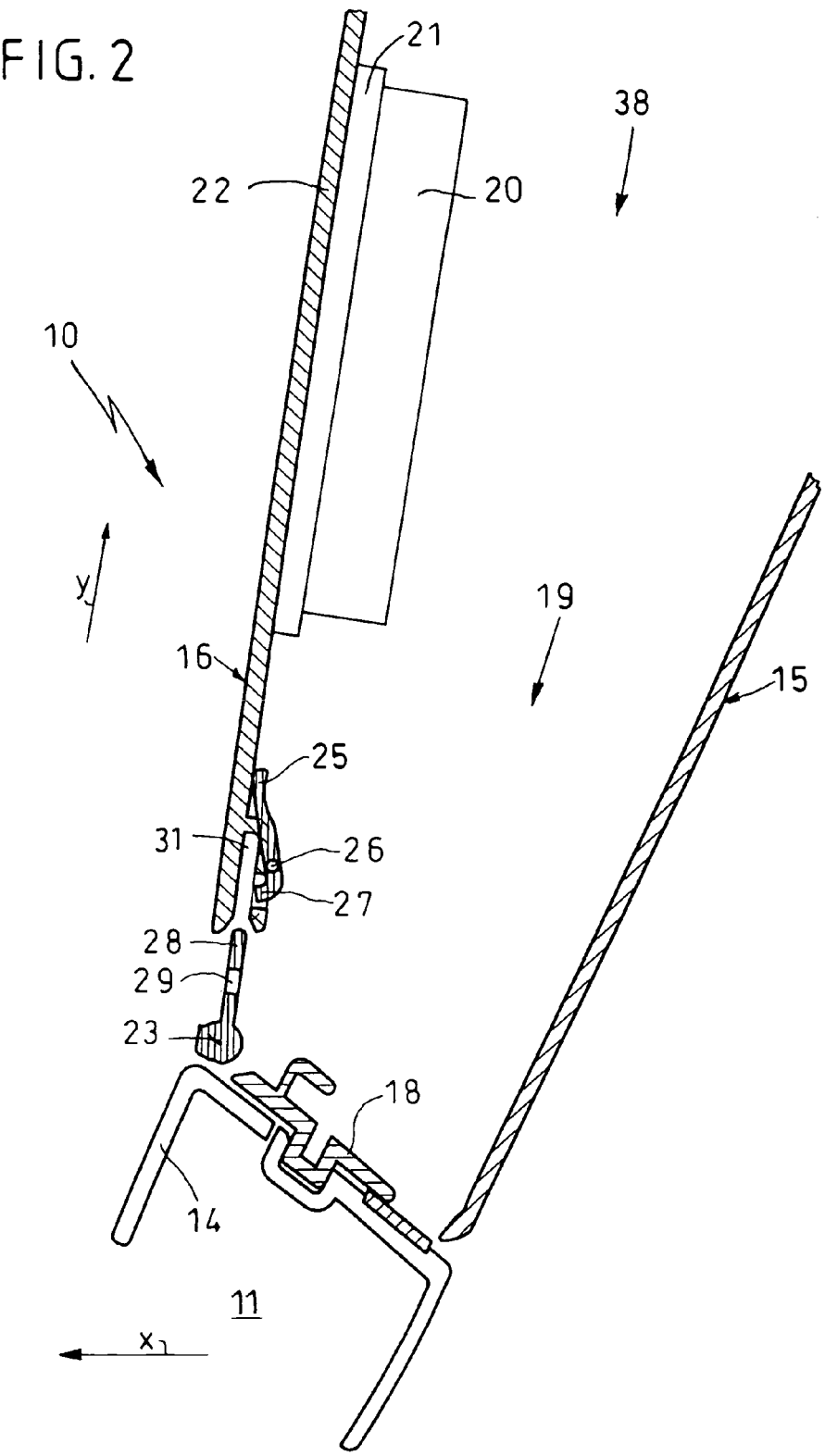

As seen in FIGS. 1 and 2 a motor-vehicle seat back as described in above-cited U.S. Pat. No. 6,398,284 comprises a partition or seat back 11 lying relative to a normal vehicle travel direction x between a rear passenger compartment, way back, or trunk compartment 12 and a front passenger compartment 13. The seat back 11 is provided with a rectangularly annular frame 14, of which only the lower horizontal member is shown, holding a container 15, of which only the lower region is also shown. Further details of the structure of the container 15, for instance how it is pivotally mounted in the frame 14 and how it is latched in place therein, can be seen in cited U.S. Pat. No. 6,398,284 whose entire disclosure is herewith incorporated by reference.

As shown in FIG. 1, the container 15 has a front wall 16 and a rear wall 17, both extending in a direction S at an angle to the vertical and backward in the direction x. An annular device frame 18 extends between the walls 16 and 17 inside the partition frame 14 and defines with the walls 16 and 17 an interior space 19. This frame 18 is of the same rectangular shape as the frame 14 and is fixed to the frame 14. A mount 21 on the inner face of the front wall 16 holds a piece 20 of equipment, for example a DVD player, a CD player, a monitor, a glass holder, a video-cassette player, or the like. The mount 21 can be releasably secured to the equipment 20.

This front wall 16 according to the invention is formed by a removable cover panel 22 secured in place at a pivot 23 mounted on the frame 18 or on the frame 14 by a releasable latch or mount 24. This pivot 23 has a radially extending tab or flap 28 formed with a transversely throughgoing hole 29 in which an end 27 of a latch hook 25 pivoted at 26 can fit to lock the cover panel 22 to the pivot 23. Thus under normal circumstances the cover 22 can pivot between the closed position of FIG. 1 parallel to the back wall 17 and the open position of FIG. 2. In addition the user can reach into the container 15 as shown by arrow 38 to operate the latch hook 25 against the force of its unillustrated biasing spring, and move it out of the hole 29 and decouple the cover 22 from the rest of the container 15. The pivot 23 here is mounted on the frame 18, but could be mounted on the frame 14.

Figure 3:
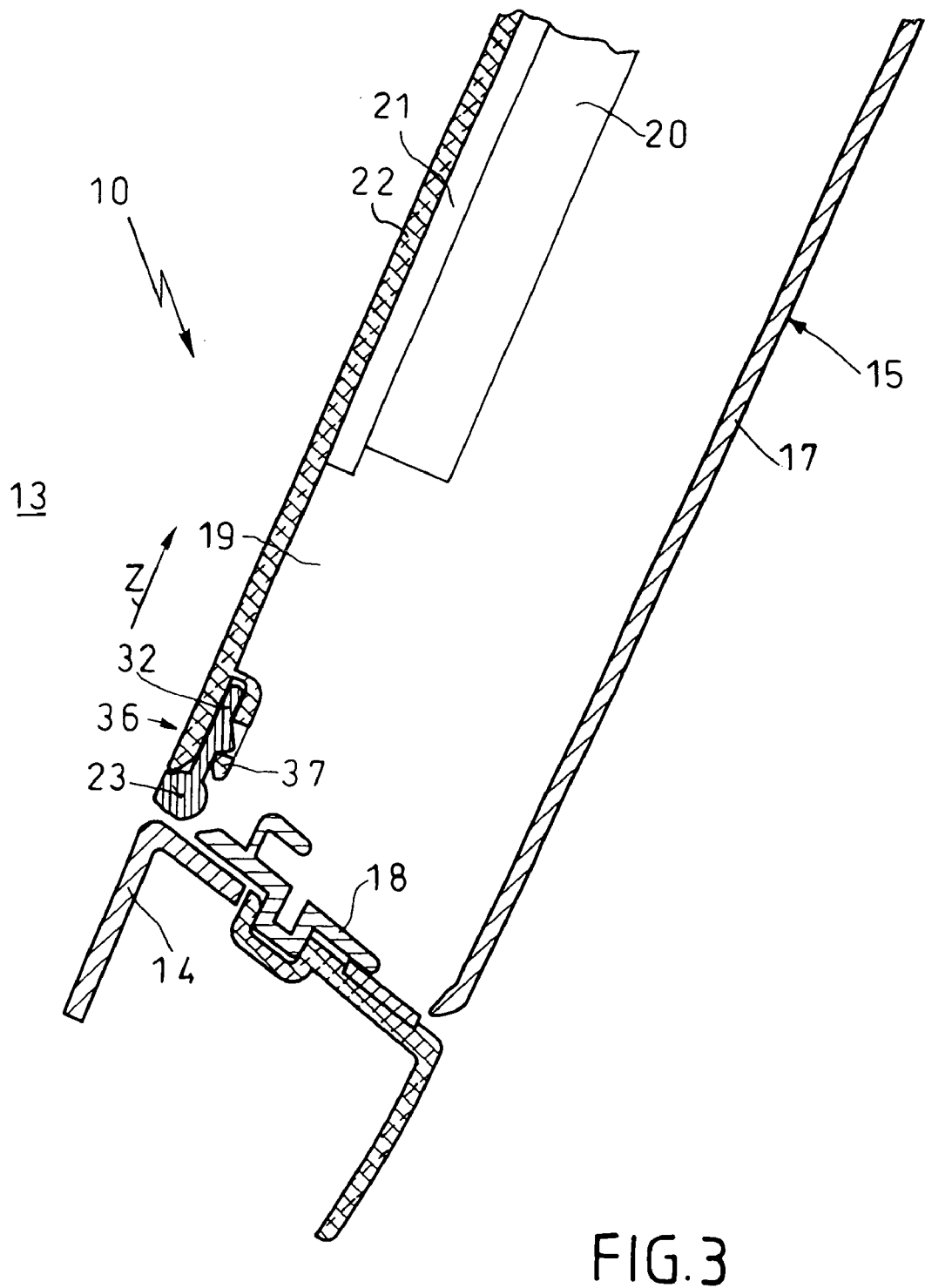
FIGS. 3 and 4 are views like FIG. 1 of an alternative system in accordance with the invention.
Figure 4:
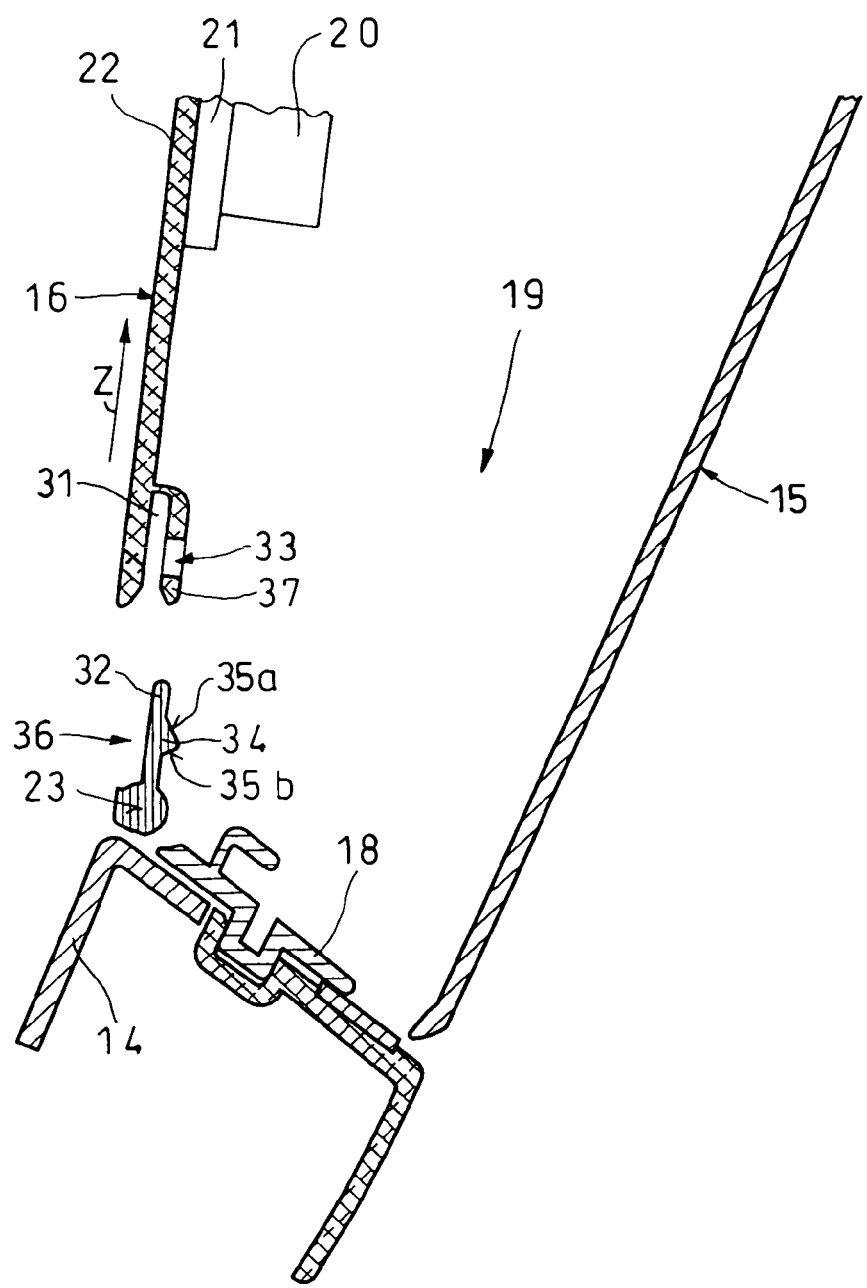

FIGS. 3 and 4 show an alternative arrangement where a latch 36 comprises a flap 32 mounted on the pivot 23 and formed with a bump 34 formed with a pair of angled flanks 35a and 35b. The cover 22 has an extension 37 forming a slot 31 in which the flap 32 is receivable, and formed with a hole or seat 33 in which the bump 34 can engage. Thus under normal circumstances the flap 32 will be fitted in the slot 31 and will hold the cover 22 in place, allowing it to pivot between the FIG. 3 closed and the FIG. 4 open positions. When pivoted out, however, if the user exerts enough force radially of the pivot 23 on the cover 22 the extension 37 will deform and the flap 32 will be released from the slot 31, allowing the cover 22 to be completely removed. The fit of the flap 32 in the slot 31 is so tight that there will be an audible snap sound to signal to the user when the connection is made or unmade.

With any of the systems according to the invention, it is possible to completely remove the cover 22 and replace it with one fitted for another automobile accessory. For instance the cover can be supplied built as a simple cup holder, but if the purchaser of the vehicle wants a CD or DVD player, the cup-holder cover is simply taken off and replaced with a special-duty cover.

The invention claimed is:

1. In a motor vehicle having a partition between two compartments, a storage compartment comprising:
   an annular vehicle frame set in the partition;
   a container set in the vehicle frame and having an open side;
   a cover fittable over the open side and having an inside face;
   mounting means for releasably securing the cover over the open side and permitting complete separation of the cover from the container;
   a piece of electronic equipment; and
   a mount securing the piece of equipment to the inside face of the cover.

2. The storage compartment defined in claim 1, further comprising
   an automobile accessory fixed to the cover.

3. The storage compartment defined in claim 1 wherein the partition is a seat back.

4. The storage compartment defined in claim 3 wherein the cover is relative to a normal motor-vehicle travel direction a front wall of the container.

5. The storage compartment defined in claim 1 wherein the mounting means includes a releasable latch actuatable to disconnect the cover.

6. In a motor vehicle having a partition between two compartments, a storage compartment comprising:
   an annular vehicle frame set in the partition;
   a container set in the vehicle frame and having an open side;
   a cover fittable over the side and movable without disconnection from the partition between a closed position and an open position; and
   mounting means including a releasable latch actuatable only in the open position for releasably securing the cover over the open side and permitting complete separation of the cover from the container.

7. The storage compartment defined in claim 5 wherein the latch includes means biasing it into a position normally securing the cover to the partition.

8. The storage compartment defined in claim 7 wherein the latch includes a hook.

9. The storage compartment defined in claim 6, further comprising
   a piece of electronic equipment; and
   a mount securing the piece of equipment to an inside face of the cover.

10. The storage compartment defined in claim 1 wherein the cover is pivotal on the vehicle frame between a closed position fitting in the frame and an open position swung out of the frame.

11. The storage compartment defined in claim 1, further comprising
    means for releasably securing the container in the vehicle frame.

12. The storage compartment defined in claim 1 further comprising
    further such covers provided with respective such mounting means intended for use with different motor-vehicle accessories.

13. In a motor vehicle having a generally vertical partition between two compartments, a storage compartment comprising:
    an annular vehicle frame fixed in the generally vertical partition;

a container set in the vehicle frame and having a generally horizontally open side;
a cover fittable over the open side;
mounting means for releasably securing the cover over the open side and permitting complete separation of the cover from the container; and
an automobile accessory releasably fixed to the cover.

14. The storage compartment defined in claim 13 wherein the cover is pivotal on the vehicle frame between a closed position fitting in the frame and an open position swung out of the frame.

* * * * *